US011904675B2

(12) United States Patent
Bell et al.

(10) Patent No.: US 11,904,675 B2
(45) Date of Patent: Feb. 20, 2024

(54) SUPPORT STRUCTURES FOR VEHICLE UNDERBODY MOUNTED BATTERY PACKS

(71) Applicant: Ford Global Technologies, LLC, Dearborn, MI (US)

(72) Inventors: Scott J. Bell, Canton, MI (US); Shane Edward Foley, Livonia, MI (US); Sukhwinder Singh Dhindsa, Windsor (CA); Jeffrey Ronald Bohmer, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 17/388,204

(22) Filed: Jul. 29, 2021

(65) Prior Publication Data

US 2023/0031771 A1 Feb. 2, 2023

(51) Int. Cl.
*B60K 1/04* (2019.01)
*H01M 50/244* (2021.01)
*H01M 50/264* (2021.01)

(52) U.S. Cl.
CPC .............. *B60K 1/04* (2013.01); *H01M 50/244* (2021.01); *H01M 50/264* (2021.01); *B60K 2001/0438* (2013.01); *H01M 2220/20* (2013.01)

(58) Field of Classification Search
CPC ............. B60K 1/04; B60K 2001/0438; H01M 50/244; H01M 50/264; H01M 2220/20
See application file for complete search history.

(56) References Cited

U.S. PATENT DOCUMENTS

| 5,390,754 | A | * | 2/1995 | Masuyama | ............. | B60L 58/18 |
|||||||180/68.5|
| 7,913,788 | B1 | * | 3/2011 | Bryer | ........................ | B60K 1/04 |
|||||||180/69.1|
| 2006/0113131 | A1 | * | 6/2006 | Kato | .................. | B62D 25/2036 |
|||||||429/434|
| 2015/0307068 | A1 | * | 10/2015 | Gaffoglio | ................ | B60L 50/60 |
|||||||414/809|
| 2020/0331536 | A1 | * | 10/2020 | Sloan | ..................... | B60L 50/64 |

* cited by examiner

*Primary Examiner* — Jason D Shanske
*Assistant Examiner* — James J Triggs
(74) *Attorney, Agent, or Firm* — David B. Kelley; Carlson, Gaskey & Olds, P.C.

(57) ABSTRACT

An electrified vehicle assembly includes a frame that has a passenger side rail and a driver side rail. The assembly further includes a battery support plate and a battery pack. The battery support plate is secured to the passenger side rail and the driver side rail. The battery pack has a plurality of cross-members. To secure the battery pack to the battery support plate, mechanical fasteners each extend through an aperture in the battery support plate to engage one of the cross-members.

14 Claims, 4 Drawing Sheets

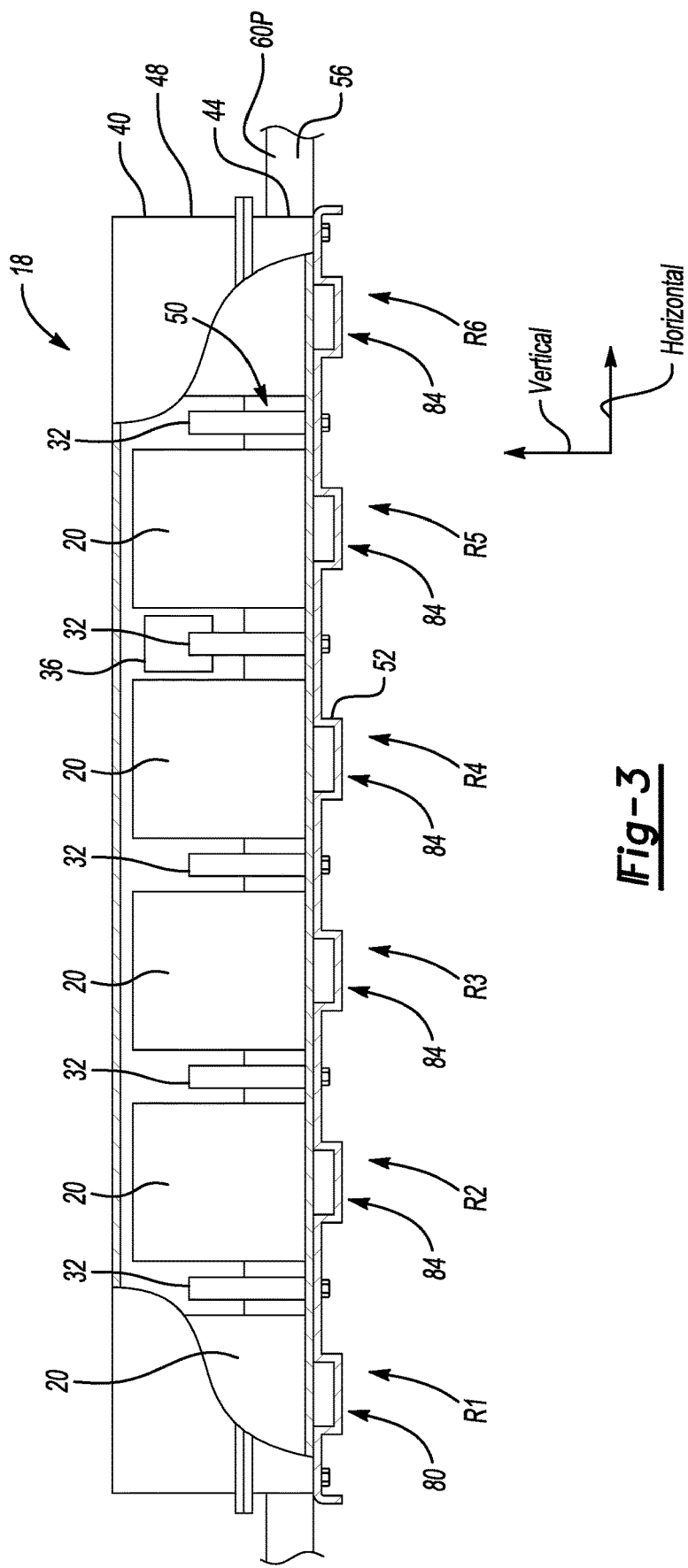

SUPPORT STRUCTURES FOR VEHICLE UNDERBODY MOUNTED BATTERY PACKS

TECHNICAL FIELD

This disclosure relates to supporting electrified vehicle battery packs and, more particularly, to structures that support and protect battery packs mounted to the underbodies of electrified vehicles.

BACKGROUND

In general, electrified vehicles differ from conventional motor vehicles because an electrified vehicle can be selectively driven by one or more battery powered electric machines. In contrast, conventional motor vehicles rely exclusively on an internal combustion engine to propel the vehicle. Electrified vehicles typically include a high-voltage traction battery pack that powers the electric machines and other electrical loads.

SUMMARY

An electrified vehicle assembly according to an exemplary aspect of the present disclosure includes, among other things, a frame that has a passenger side rail and a driver side rail. The assembly further includes a battery support plate and a battery pack. The battery support plate is secured to the passenger side rail and the driver side rail. The battery pack has a plurality of cross-members. To secure the battery pack to the battery support plate, mechanical fasteners each extend through an aperture in the battery support plate to engage one of the cross-members.

In a further embodiment of the foregoing assembly, the battery pack is supported relative to the frame by the battery support plate.

In a further embodiment of any of the foregoing assemblies, the battery pack is positioned at least partially between the passenger side rail and the driver side rail.

In a further embodiment of any of the foregoing assemblies, the battery support plate is a completely separate component from an enclosure assembly of the battery pack.

An electrified vehicle assembly according to another exemplary embodiment of the present disclosure includes an enclosure assembly of the battery pack. The enclosure assembly houses the plurality of cross-members. The enclosure assembly includes a tray. The mechanical fasteners each extend through an aperture in the tray to engage the one of the cross-members.

In another exemplary embodiment of any of the foregoing assemblies, the cross-members extend longitudinally in a cross-vehicle direction.

In another exemplary embodiment of any of the foregoing assemblies, the mechanical fasteners threadably engage the cross-members.

In another exemplary embodiment of any of the foregoing assemblies, the battery support plate includes a rib projecting vertically downward beneath all portions of the mechanical fasteners that engage the one of the cross-members. The rib extends longitudinally in a cross-vehicle direction. The rib is forward the mechanical fasteners that engage the one of the cross-members.

In another exemplary embodiment of any of the foregoing assemblies, the battery support plate includes a raised area that extends longitudinally through the rib in a direction that is angled relative to the cross-vehicle direction.

Another exemplary embodiment of any of the foregoing assemblies includes isolators. The mechanical fasteners each extend through one or more of the isolators.

Another exemplary embodiment of any of the foregoing assemblies includes at least two jacking pad cutouts that open to a passenger side of the battery support plate and at least two jacking pad cutouts that open to a driver side of the battery support plate.

In another exemplary embodiment of any of the foregoing assemblies, the mechanical fasteners are first mechanical fasteners. The assembly further includes second mechanical fasteners that each extend through an aperture in the battery support plate to engage the passenger side rail or the driver side rail.

In another exemplary embodiment of any of the foregoing assemblies, the second mechanical fasteners are bolts that are configured to threadably engage nuts disposed within an interior of the passenger side rail or the driver side rail.

A method according to another exemplary aspect of the present disclosure includes, among other things, mounting a battery support plate to a battery pack and mounting the battery support plate to both a passenger side rail and a driver side rail of a frame of an electrified vehicle. This supports the battery pack relative to the frame.

In another exemplary embodiment of any of the foregoing methods, mounting the battery support plate to the battery pack includes inserting fasteners through respective apertures in the battery support plate to engage respective cross-members within the battery pack.

In another exemplary embodiment of the foregoing method, mounting the battery support structure to the frame includes inserting the fasteners through isolators and inserting the fasteners through apertures within an enclosure tray of the battery pack.

In another exemplary embodiment of any of the foregoing methods, mounting the battery support plate to the passenger side rail and the driver side rail includes inserting fasteners through respective apertures in the battery support plate to engage the passenger side rail or the driver side rail.

Another exemplary embodiment of any of the foregoing methods includes shielding the fasteners using a rib of the battery support plate. The rib projects vertically downward beneath all portions of the fasteners that engage one of the cross-members. The rib extends longitudinally in a cross-vehicle direction. The rib is forward the fasteners that engage the one of the cross-members.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The various features and advantages of this disclosure will become apparent to those skilled in the art from the following detailed description. The drawings that accompany the detailed description can be briefly described as follows.

FIG. 3 is a section view taken at line 2-2 in FIG. 3.

DETAILED DESCRIPTION

This disclosure details assemblies and methods for supporting and protecting vehicle underbody-mounted battery packs.

An exemplary electrified vehicle can include a passenger side rail, a driver side rail, and a battery support plate spanning therebetween. A battery pack can be supported relative to the rails of the frame by the battery support plate. The battery support plate is a single unitary structure utilized to support the battery pack, not an assembly comprising multiple individual pieces that are welded together to provide a battery pack support assembly. The battery pack is not itself directly coupled to the rails.

These and other features are discussed in greater detail in the following paragraphs.

Figure 1:
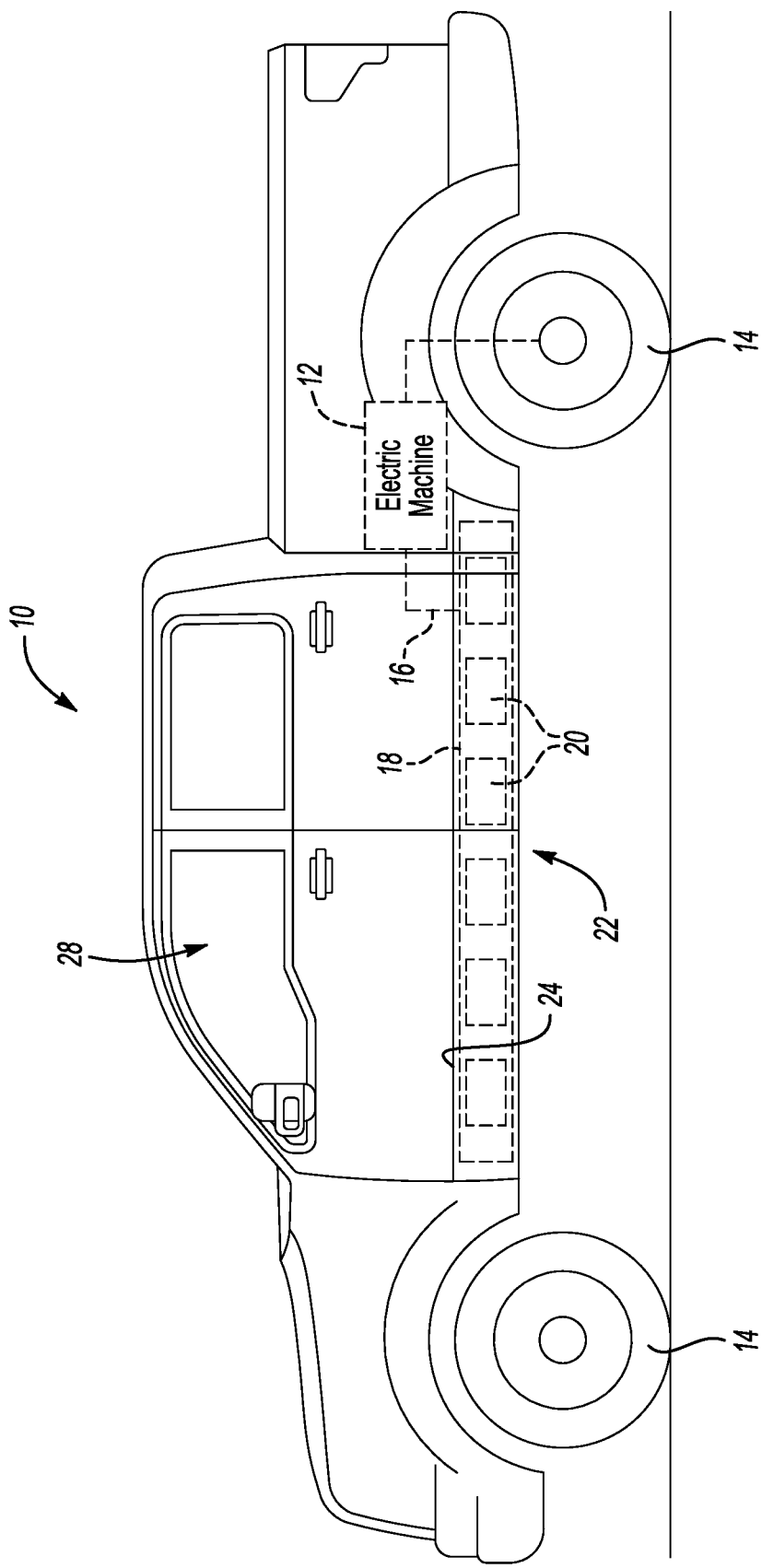
FIG. 1 illustrates a partially schematic side view of an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

In an embodiment, the electrified vehicle 10 is a pickup truck. However, the electrified vehicle 10 could also be a car, a van, a sport utility vehicle, or any other type of vehicle. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14.

A voltage bus 16 electrically connects the electric machine 12 to a battery pack 18. The battery pack 18 is an exemplary electrified vehicle battery. The battery pack 18 may be a high-voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The battery pack 18 may be mounted at various locations of the electrified vehicle 10. In an embodiment, the battery pack 18 is mounted to an underbody 22 of the vehicle 10. In particular, the battery pack 18 may be suspended from or otherwise mounted relative to a vehicle frame beneath a floor 24 of a passenger cabin 28 of the vehicle 10.

Due at least in part to the mounting location at the underbody 22, the battery pack 18 may be susceptible to various vehicle loads including, but not limited to, impact loads (e.g., loads imparted during vehicle impact and running clearance events, for example), durability loads, torsional loads, bending loads, and noise, vibration, and harshness (NVH) loads. Novel battery support structures are therefore proposed in this disclosure. As discussed in greater detail below, the exemplary battery support structures are capable of supporting and protecting the battery pack 18 and isolating the battery pack 18 from the various loads that may be imparted during operations of the electrified vehicle 10.

Figure 2:
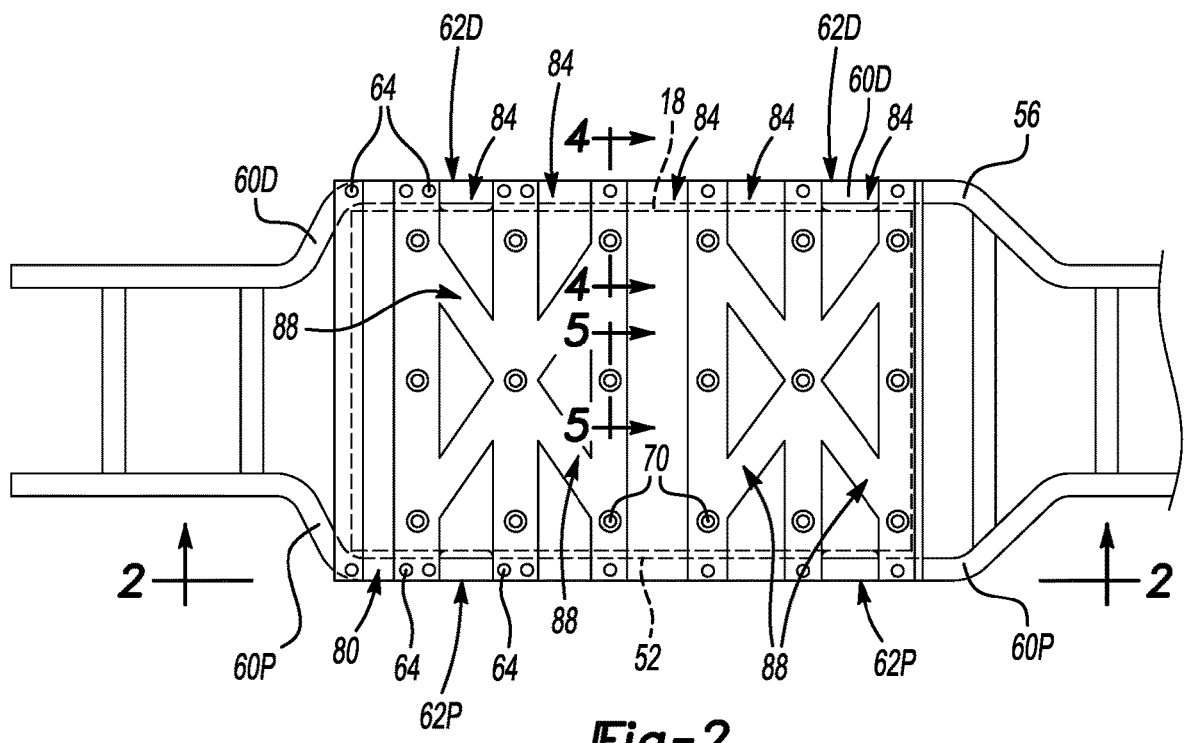
FIG. 2 is a view of an underside of the vehicle of FIG. 1.
Figure 4:
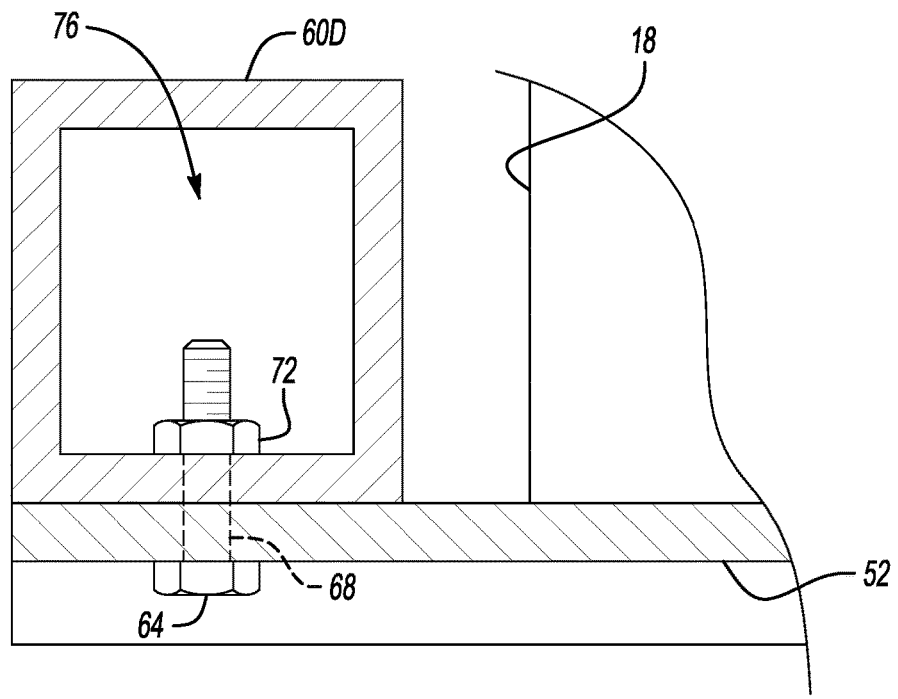
FIG. 4 is a section view taken at line 4-4 in FIG. 2.

With reference now to FIGS. 2 and 3 and continuing reference to FIG. 1, the battery pack 18 houses a plurality of battery arrays 20 arranged in rows R1-R6. The rows R1-R6 extending longitudinally in a cross-vehicle direction.

Battery cells within the battery arrays 20 store energy for powering various electrical loads of the electrified vehicle 10, such as the electric machine 12 of FIG. 1, for example. In an embodiment, the battery cells are prismatic lithium ion battery cells. However, battery cells having other geometries (cylindrical, pouch, etc.), other chemistries (nickel-metal hydride, lead-acid, etc.) or both could alternatively be utilized.

The battery pack 18 includes cross-members 32 are disposed between the rows R1-R6 of battery arrays 20 along a length of the vehicle 10. The cross-members 32 extend longitudinally in a cross-vehicle direction The cross-members 32 can be extruded cross-members.

The battery pack 18 can also include one or more battery electronic components 36. The battery electronic component 36 could include a bussed electrical center (BEC), a battery electronic control module (BECM), wiring harnesses, wiring loops, high/low connectors, etc. or, any combination of these and other battery electronic components.

The battery pack 18 additionally includes an enclosure assembly 40 that houses the battery arrays 20, the cross-members 32, and the battery electronic components 36. In this example, the enclosure assembly 40 includes a tray 44 and a lid 48 that are joined together to enclose the battery arrays 20, cross-members 32, and battery electronic components 36.

In an embodiment, the enclosure assembly 40 is a sealed enclosure. The enclosure assembly 40 can include any size, shape, and configuration within the scope of this disclosure. The tray 44 and the lid 48 cooperate in the exemplary embodiment to surround and completely enclose the battery arrays 20, cross-members 32, and battery electronic components 36.

The tray 44 can provide an open area 50 for holding the battery arrays 20, cross-members 32, and the battery electronic components 36. After positioning these components within the open area 50, the lid 48 can be seated and sealed to the tray 44 to enclose these components within the enclosure assembly.

In an embodiment, the enclosure assembly 40 is a metallic-based component. For example, the tray 44 and the lid 48 could be constructed out of aluminum or steel. In another embodiment, the enclosure assembly 40 is a polymer-based component. For example, the tray 44 and the lid 48 could be constructed (e.g., molded) of expanded polymer-based materials, solid polymer-based materials or a combination of such materials. The exemplary expanded polymer-based materials can include, but are not limited to, expanded polypropylene, expanded polystyrene, and expanded polyethylene. Exemplary solid polymer-based materials can include, but are not limited to, sheet molding compounds (e.g., glass-fiber reinforced polyester), polypropylene, and polyamine In yet another embodiment, the enclosure assembly 40 could be constructed of metallic-based and polymer-based components. For example, the tray 44 could be a metallic-based component and the lid 48 could be a polymer-based component. Other configurations are also contemplated within the scope of this disclosure.

To secure the battery pack 18 relative to the underbody 22, the battery pack 18 is supported on a battery support plate 52, which is secured to a frame 56 of the electrified vehicle 10. The battery support plate 52 and frame 56 can help to protect the battery pack 18 from various vehicle loads.

The frame 56 is the main support structure of the electrified vehicle 10 to which various components are attached either directly or indirectly. The frame 56 may be made of a metallic material, such as steel, carbon steel, or an aluminum alloy as non-limiting examples. In this example, the frame 56 includes a passenger side rail 60P and the driver side rail 60D. The rails 60P, 60D are spaced apart from one another and extend longitudinally and parallel with the length of the electrified vehicle 10.

The battery support plate 52 is, in this example, secured directly to both the passenger side rail 60P and the driver side rail 60D. In this example, the battery support plate 52 is secured directly to the rails 60P, 60D with a plurality of mechanical fasteners 64 that extend through apertures 68 in the battery support plate 52 to engage with nuts 72 housed within an interior 76 of the passenger side rail 60P or the driver side rail 60D when the battery support plate 52 is secured to the rails 60P, 60D. In some examples, the nuts 72 are U-nuts. Other techniques for directly connecting battery support plate 52 to the rails 60P, 60D are contemplated as well within the scope of this disclosure.

The battery support plate 52, in the exemplary embodiment, includes at least two jacking pad cutouts 62P that open to a passenger side of the battery support plate 52 and at least two jacking pad cutouts 62D that open to a driver side of the battery support plate 52.

The battery support plate 52, in the example embodiment, is a continuous monolythic structure spanning from the rail 60P to the 60D. The battery support plate 52 establishes a relatively rigid, mechanical protective shield that supports the battery pack 18. The battery support plate 52 also can stiffen the vehicle frame 56, which can help to reduce torsional twist and may prevent various loads from being transferred to the battery pack 18.

The battery support plate 52, in the exemplary embodiment, is a stamped metallic or metal alloy structure. In a specific example, the battery support plate 52 is high-strength steel. However, mild steels and other metals could be utilized.

In this example, the battery pack 18 is secured directly to the battery support plate 52. This supports the battery pack 18 relative to the frame 56. When the battery pack 18 is secured to the battery support plate 52 and the battery support plate 52 is mounted to the frame 56, the battery pack 18 is positioned at least partially between the rails 60P, 60D.

Figure 5:
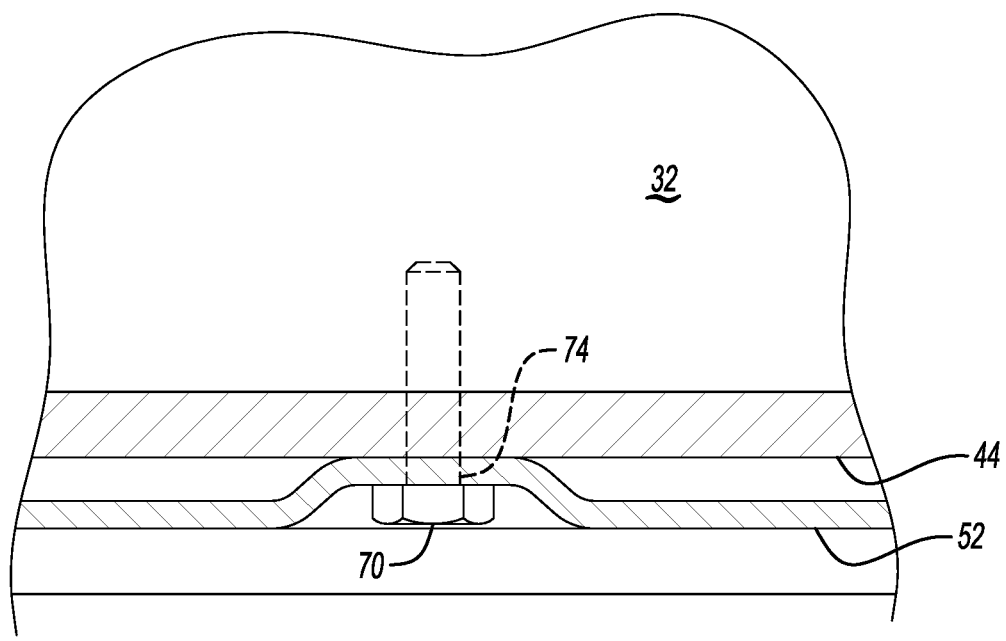
FIG. 5 is a section view taken at line 5-5 in FIG. 2.

With reference to FIG. 5 and continuing reference to FIGS. 1-4, to secure the battery pack 18 relative to the battery support plate 52, a plurality of mechanical fasteners 70 are each extended through apertures 74 in the battery support plate 52 and the tray 44. The mechanical fasteners 70 extend through the battery support plate 52 and the tray 44 to engage with the cross-members 32, which are inside the enclosure assembly 40. The fasteners 70 can threadably engage the cross-members 32. The cross-members 32 can include threaded bores so that the cross-members 32 can threadably engage with the fasteners 70.

The fasteners 70 are mechanical fasteners, such as bolts or screws, although other types of fasteners could be used. The fasteners 70 provide high strength connectors for fixedly mounting the battery pack 18 to the battery support plate 52. The battery support plate 52 is, notably, a completely separate component from the tray 44 of the enclosure assembly.

In this example, the battery support plate 52 directly contacts the tray 44 in the areas where the fasteners 70 are engaging the cross-members.

Figure 5A:
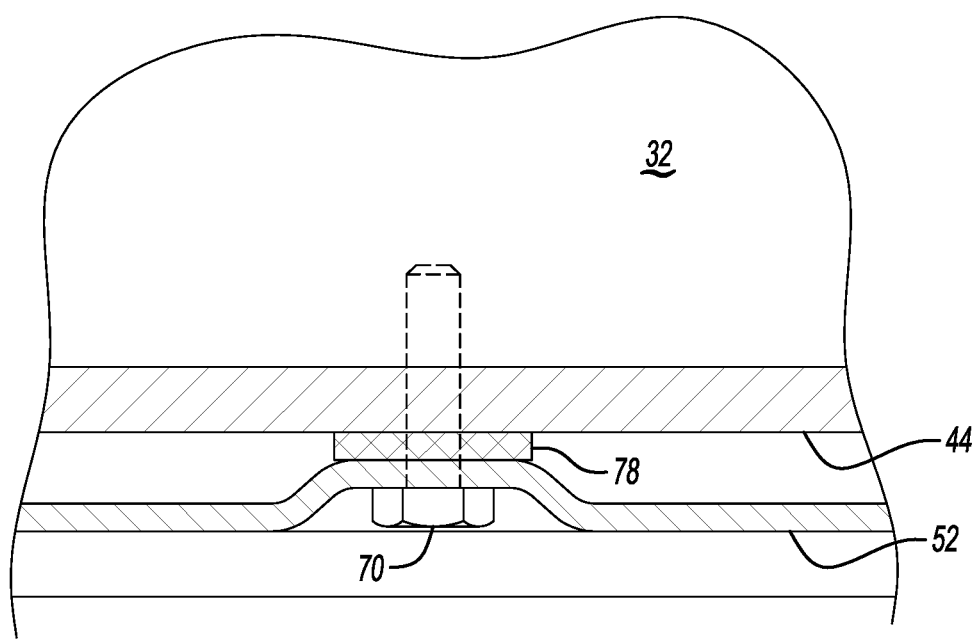
FIG. 5A is a section view taken at line 5-5 according to another exemplary aspect of the present disclosure.

In other examples, as shown in FIG. 5A, an isolator 78 is sandwiched between the tray 44 and the battery support plate 52 when the fasteners 70 are engaging the cross-members 32. The fasteners 70 could extend through an aperture within the isolator 78.

The isolators 78, which may be referred to as bushings, are configured to dampen energy that is transmitted to the vehicle frame 56 and/or the battery support plate 52. Stated another way, the isolators 78 act as points of isolation for isolating the battery pack 18 from vibrations and loads that may act on the vehicle frame 56 and/or the battery support plate 52.

The isolators 78 can permit a relatively small amount of movement to occur between the battery pack 18 and the battery support plate 52. For example, the isolators 78 may allow the battery pack 18 to slightly move in multiple degrees of freedom relative to the battery support plate 52.

Referring again to FIGS. 1-5, the exemplary battery support plate 52 includes at least one rib 80 projecting vertically downward. Vertical is with reference to ground and an ordinary orientation of the vehicle 10 during operation. The rib 80 extends longitudinally in a cross-vehicle direction D, which is parallel to a Y-axis or lateral axis of the vehicle 10

The rib 80 is forward the fasteners 70 that engage the cross-members 32. The rib 80 extends, in this example, vertically downward past the heads of the fasteners 70. The rib 80 can help to protect the fasteners 70 as the vehicle 10 is driven. Additionally, the rib 80 can enhance torsional stability of the battery support plate 52.

The rib 80 is a first rib established within the support plate. Moving rearward, the battery support plate 52 includes other ribs 84. The other ribs 84 extend substantially parallel to the first rib 80 and can be positioned directly forward other fasteners 70

The battery support plate 52 can be formed with raised areas 88 that extend through the ribs 84. The raised areas 88 extend longitudinally in a direction angled relative to the cross-vehicle direction D. The raised areas 88 can enhance torsional stiffness of the battery support plate 52.

The battery support structures of this disclosure provide mounting solutions for supporting a battery pack relative to a frame of an electrified vehicle. The battery support frame can protect and isolate the battery pack from various vehicle loads while providing a less complex mounting structure than previous designs, which required multiple components welded together.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle assembly, comprising:
   a frame including a passenger side rail and a driver side rail;
   a battery support plate secured to the passenger side rail and the driver side rail;
   a battery pack including a plurality of cross-members;
   a plurality of mechanical fasteners that each extend through an aperture in the battery support plate to engage one of the cross-members to secure the battery pack to the battery support plate; and
   an enclosure assembly of the battery pack, the enclosure assembly housing the plurality of cross-members, the enclosure assembly including a tray, wherein the plurality of mechanical fasteners each extend through an aperture in the tray to engage the one of the cross-members.

2. The electrified vehicle assembly of claim 1, wherein the battery pack is supported relative to the frame by the battery support plate.

3. The electrified vehicle assembly of claim 1, wherein at least a portion of the battery pack is positioned between the passenger side rail and the driver side rail.

4. The electrified vehicle assembly of claim 1, wherein the battery support plate is a completely separate component from the enclosure assembly of the battery pack.

5. The electrified vehicle assembly of claim 1, wherein the plurality of cross-members extend longitudinally in a cross-vehicle direction.

6. The electrified vehicle assembly of claim 1, wherein the plurality of mechanical fasteners threadably engage the cross-members.

7. The electrified vehicle assembly of claim 1, further comprising a plurality of isolators, the plurality of mechanical fasteners each extending through one or more of the plurality of isolators.

8. The electrified vehicle assembly of claim 1, further comprising at least two jacking pad cutouts opening to a passenger side of the battery support plate, and at least two jacking pad cutouts opening to a driver side of the battery support plate.

9. The electrified vehicle assembly of claim 1, wherein the plurality of mechanical fasteners are a plurality of first mechanical fasteners, and further comprising a plurality of second mechanical fasteners that each extend through an aperture in the battery support plate to engage the passenger side rail or the driver side rail.

10. The electrified vehicle assembly of claim 9, wherein the plurality of second mechanical fasteners are bolts configured to threadably engage nuts disposed within an interior of the passenger side rail or the driver side rail.

11. An electrified vehicle assembly, comprising:
    a frame including a passenger side rail and a driver side rail;
    a battery support plate secured to the passenger side rail and the driver side rail;
    a battery pack including a plurality of cross-members;
    a plurality of mechanical fasteners that each extend through an aperture in the battery support plate to engage one of the cross-members to secure the battery pack to the battery support plate, wherein the battery support plate includes a rib projecting vertically downward beneath all portions of the plurality of mechanical fasteners that engage the one of the cross-members, the rib extending longitudinally in a cross-vehicle direction; and
    a raised area that extends longitudinally through the rib in a direction that is angled relative to the cross-vehicle direction.

12. The electrified vehicle assembly of claim 11, wherein, with reference to an orientation of a vehicle having the battery support plate, the rib is forward of the plurality of mechanical fasteners that engage the cross-member.

13. A method, comprising:
    mounting a battery support plate to a battery pack;
    mounting the battery support plate to both a passenger side rail and a driver side rail of a frame of an electrified vehicle, thereby supporting the battery pack relative to the frame; and
    inserting a plurality of fasteners through respective apertures in the battery support plate to engage a respective cross-member within the battery pack,
    wherein mounting the battery support plate to the passenger side rail and the driver side rail includes:
        inserting a plurality of fasteners through respective apertures in the battery support plate to engage the passenger side rail or the driver side rail.

14. The method as recited in claim 13, wherein mounting the battery support plate to the frame further includes inserting the plurality of fasteners through respective isolators, and inserting the plurality of fasteners through respective apertures within an enclosure tray of the battery pack.

* * * * *